(12) United States Patent
Kurihara et al.

(10) Patent No.: US 11,718,178 B2
(45) Date of Patent: Aug. 8, 2023

(54) VEHICLE BODY STRUCTURE HAVING HEAD-UP DISPLAY

(71) Applicant: HONDA MOTOR CO., LTD., Tokyo (JP)

(72) Inventors: Yohei Kurihara, Tokyo (JP); Kazuo Sakurai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/581,142

(22) Filed: Jan. 21, 2022

(65) Prior Publication Data

US 2022/0289027 A1 Sep. 15, 2022

(30) Foreign Application Priority Data

Mar. 9, 2021 (JP) ................................. 2021-037670

(51) Int. Cl.
*G02B 27/01* (2006.01)
*B60K 35/00* (2006.01)
*G02B 1/118* (2015.01)

(52) U.S. Cl.
CPC .............. *B60K 35/00* (2013.01); *G02B 1/118* (2013.01); *G02B 27/0101* (2013.01); *B60K 2370/1529* (2019.05); *B60K 2370/23* (2019.05)

(58) Field of Classification Search
CPC ...................................................... B60K 35/00
See application file for complete search history.

(56) References Cited

U.S. PATENT DOCUMENTS

| | | | |
|---|---|---|---|
| 6,185,045 B1 * | 2/2001 | Hanano .............. | G02B 27/0172 359/633 |
| 2016/0343967 A1 * | 11/2016 | Dai ......................... | H01L 51/52 |
| 2017/0059864 A1 * | 3/2017 | Takahashi ........... | G02B 27/0101 |
| 2020/0369007 A1 * | 11/2020 | Bauerle ............. | B32B 17/10761 |

FOREIGN PATENT DOCUMENTS

JP 2015129877 A 7/2015

* cited by examiner

*Primary Examiner* — Nan-Ying Yang
(74) *Attorney, Agent, or Firm* — Armstrong Teasdale LLP

(57) ABSTRACT

A vehicle body structure having a head-up display, includes: a window that defines a cabin and is used as a reflector of the head-up display; and an image projection device that projects an image toward the window. An image projection surface of the window that is positioned closest to the cabin includes a prescribed image projection area onto which the image is projected and a surrounding area that surrounds the image projection area. Of the image projection area and the surrounding area of the image projection surface, only the surrounding area is formed with a moth-eye structure.

1 Claim, 6 Drawing Sheets

VEHICLE BODY STRUCTURE HAVING HEAD-UP DISPLAY

TECHNICAL FIELD

The present invention relates to a vehicle body structure having a head-up display that displays information for a user, such as a driver, on the window.

BACKGROUND ART

Conventionally, a head-up display installed in a vehicle such as an automobile includes an image projection device that projects an image onto a transparent reflector, such as a window, so that the reflected image is visually recognized by a user such as a driver. Since the image visually recognized by the user is required to have high visibility, technology to improve the visibility of the image is being developed.

For example, the light from the light source of the image projection device provided in the cabin may be reflected not only by the surface of the reflector on the innermost side with respect to the cabin but also by the surface of the reflector on the outermost side with respect to the cabin, and these lights reflected by the innermost surface and the outermost surface of the reflector can create double image due to misalignment therebetween. To solve such a problem, there is proposed a display member (reflector) for a vehicle which is provided with a reflection suppression structure for preventing the outermost surface of the display member from reflecting the light emitted from the light source and entering the display member without being reflected by the surface opposite from the outermost surface (see JP2015-129877A). It is described in this prior art publication that the display member may be a windshield and the reflection suppression structure provided on the windshield may be a moth-eye structure fabricated on the outermost surface.

As a result of earnest studies, the inventors of the present application found that to improve the visibility of the image in the head-up display, it is important, particularly on the cabin-side surface of the window (reflector), to properly suppress reflection of light in a surrounding area that surrounds a prescribed reflection area (namely, an image projection area) of the light from the light source (image projection device) and propagation of light from the surrounding area to the image projection area.

In the aforementioned prior art publication, from the point of view of improving the visibility of the image presented to the user, there is no proposal with regard to the light reflected by the cabin-side surface (the surface positioned closest to the cabin).

SUMMARY OF THE INVENTION

In view of the foregoing background, a primary object of the present invention is to provide a vehicle body structure that can suppress reflection of light from the surrounding area that surrounds a prescribed image projection area of the image projection surface of the window used as a reflector of the head-up display and propagation of light from the surrounding area to the image projection area.

To achieve the above object, one aspect of the present invention provides a vehicle body structure having a head-up display (11), comprising: a window (5) that defines a cabin (9) and is used as a reflector of the head-up display; and an image projection device (27) that projects an image toward the window, wherein an image projection surface (5A) of the window that is positioned closest to the cabin includes a prescribed image projection area (15) onto which the image is projected and a surrounding area (17) that surrounds the image projection area, and of the image projection area and the surrounding area of the image projection surface, only the surrounding area is formed with a moth-eye structure (53).

According to this aspect, it is possible to suppress reflection of light from the surrounding area that surrounds a prescribed image projection area of the image projection surface of the window used as a reflector of the head-up display and propagation of light from the surrounding area to the image projection area.

In the above aspect, preferably, the vehicle body structure further comprises an external environment sensor (12) disposed in the cabin so as to oppose the image projection surface.

According to this aspect, performance degradation of the external environment sensor due to multi-reflection of the light incident on and propagating in the window when an image is projected onto the window can be suppressed.

In the above aspect, preferably, the moth-eye structure formed on the surrounding area includes multiple bumps (52), and the multiple bumps have at least one of a gradual decrease of a bump height, a gradual decrease of a bump density, and a gradual increase of an interval between adjacent bumps, from a position remote from the image projection area toward a periphery (15A) of the image projection area.

According to this aspect, the boundary between the image displayed on the image projection area and the surrounding area formed with the moth-eye structure becomes less conspicuous so that discomfort of the user is reduced and the design of the image projection area and its surroundings improves.

In the above aspect, preferably, the window comprises: a window main body (13); a moth-eye film (25) attached to a cabin-side surface of the window main body and formed with the moth-eye structure; and an image projection film (61) disposed on the image projection area.

According to this aspect, the image projection film improves visibility of the image in the image projection area while the moth-eye film suppresses reflection of light from the surrounding area and propagation of light from the surrounding area to the image projection area.

In the above aspect, preferably, the moth-eye film is disposed on the image projection area and the surrounding area, and the image projection film is attached to a cabin-side surface of a part of the moth-eye film corresponding to the image projection area.

According to this aspect, with a simple configuration, visibility of the image in the image projection area can be improved, while the moth-eye film can suppress reflection of light from the surrounding area and propagation of light from the surrounding area to the image projection area.

In the above aspect, preferably, the moth-eye film is annular in shape and is disposed on the surrounding area, and the image projection film is disposed on the image projection area positioned within the annular moth-eye film on the cabin-side surface of the window main body.

According to this aspect, when both of the moth-eye film and the image projection film are attached to the window, increase of the substantive thickness the window can be suppressed.

According to the foregoing configuration, it is possible to provide a vehicle body structure that can suppress reflection of light in the surrounding area that surrounds a prescribed image projection area of the image projection surface of the window used as a reflector of the head-up display and propagation of light from the surrounding area to the image projection area.

DETAILED DESCRIPTION OF THE INVENTION

In the following, a vehicle provided with a vehicle body structure having a head-up display according to an embodiment of the present invention will be described with reference to the drawings.

Figure 1:
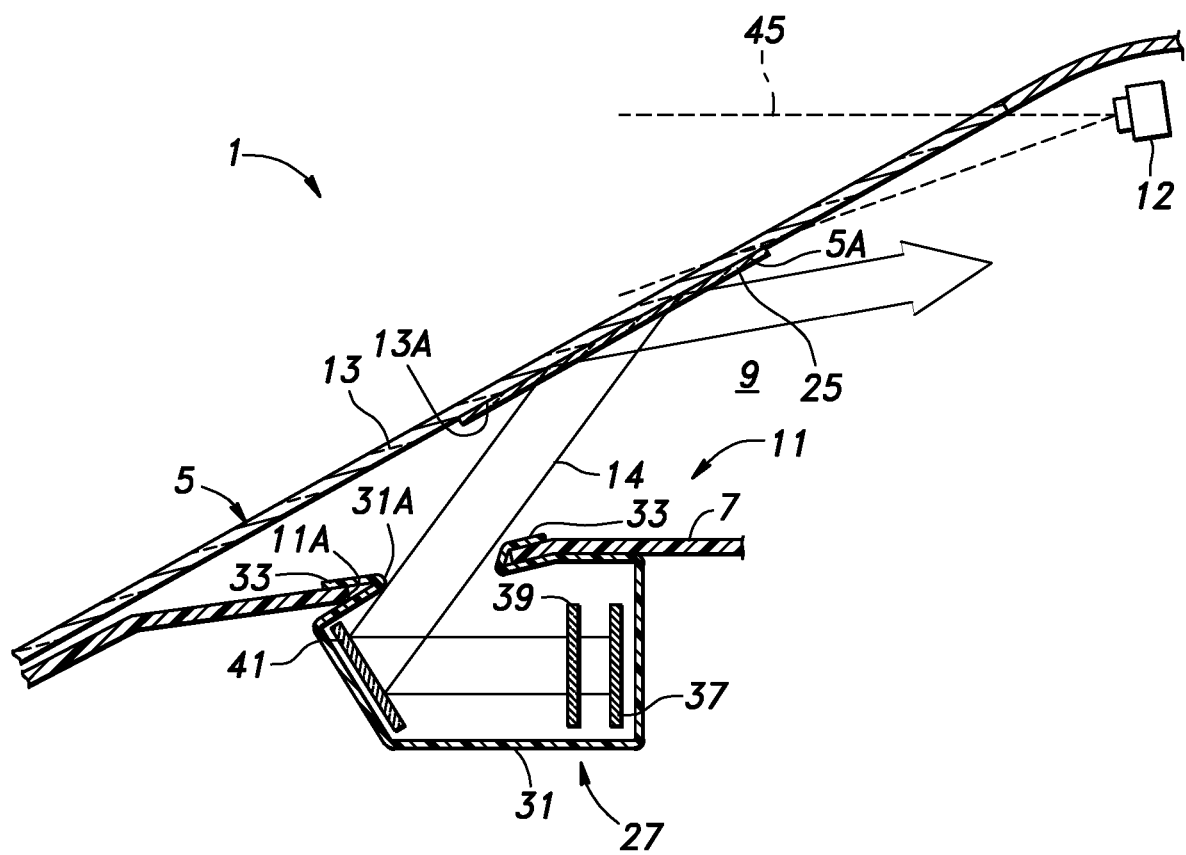
FIG. 1 is a sectional view of a main part of a vehicle provided with a vehicle body structure having a head-up display according to an embodiment of the present invention.
Figure 2:
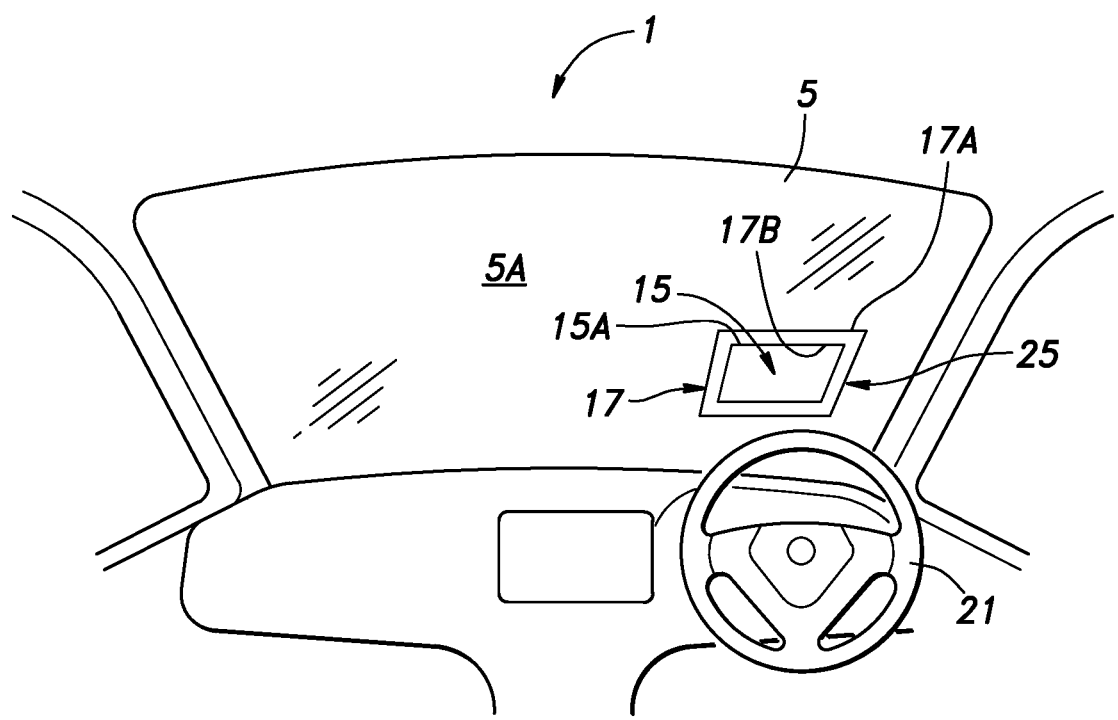
FIG. 2 is an explanatory diagram showing an image projection surface of a windshield and the structure around it.

As shown in FIGS. 1 and 2, an automobile (vehicle) 1 is provided with a windshield 5 as a window that constitutes a part of a vehicle body 3. The windshield 5 defines a front portion of a cabin 9 jointly with a dashboard panel 7. In the front portion of the cabin 9, a head-up display 11 (hereinafter referred to as an HUD 11) that displays information for a user (here, a driver not shown in the drawings) on the windshield 5. Also, a camera 12 is provided in an upper portion of the cabin 9 so as to oppose the windshield 5.

The windshield 5 is used as a reflector for the HUD 11. The windshield 5 includes a transparent windshield main body 13 formed of laminated glass having an intermediate film (not shown in the drawings), for example. Image light 14 from the light source of the HUD 11 is projected onto a part of a surface 5A of the windshield 5 that is positioned closest to the cabin 9 (hereinafter referred to as an image projection surface 5A).

As shown in FIG. 2, the image projection surface 5A of the windshield 5 includes a prescribed area 15 onto which an image light 14 for forming an image (video or still image) is projected (displayed). Hereinafter, this area will be referred to as the image projection area 15. Also, the image projection surface 5A includes an annular area 17 surrounding the image projection area 15. Hereinafter, this annular area will be referred to as the surrounding area 17. In the present embodiment, the image projection area 15 and the surrounding area 17 are disposed substantially in front of the driver's seat provided with a steering wheel 21.

The size and shape of the surrounding area 17 may be changed as appropriate from a point of view of suppressing reflection of light from the surroundings of the image projection area 15 of the image projection surface 5A of the windshield 5 and propagation of light from the surroundings of the image projection area 15 to the image projection area 15. In deciding the size and shape of the surrounding area 17, an average field of view of users (here, the driver) with reference to the center of the image projection surface 5A may be taken into consideration. The shape of the surrounding area 17 is not limited to an annular shape and the surrounding area 17 may be constituted of multiple regions arranged at prescribed intervals to surround the image projection area 15, for example.

Figure 3:
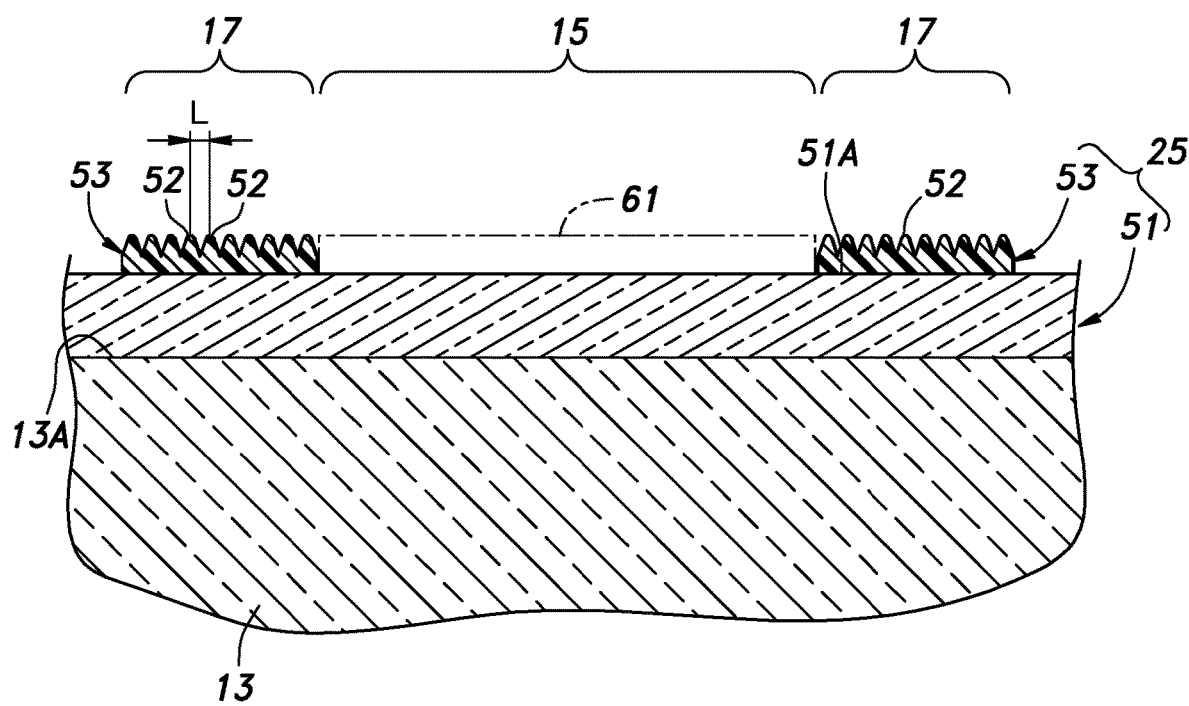
FIG. 3 is a schematic sectional view showing an example of a moth-eye structure.

Of the image projection area 15 and the surrounding area 17 on the image projection surface 5A of the windshield 5, only the surrounding area 17 is formed with a moth-eye structure 53 (see FIG. 3). More specifically, a film 25 formed with the moth-eye structure 53 (hereinafter referred to as a moth-eye film 25) is attached (pasted) to a part of an inner surface 13A of the windshield main body 13 corresponding to at least the surrounding area 17. The moth-eye film 25 has a substantially rectangular outer edge as viewed in a direction substantially perpendicular to the windshield 5.

Note that in the part of the windshield 5 to which the moth-eye film 25 is attached, the inner surface (the surface facing the cabin 9) of the moth-eye film 25 corresponds to the image projection surface 5A of the windshield 5.

The HUD 11 includes an image projection device 27 having a known hardware configuration as a head-up display main body that projects the image light 14 on the image projection surface 5A of the windshield 5 (the image projection area 15).

For example, as shown in FIG. 1, the image projection device 27 includes a substantially concave housing 31 having an opening 31A formed in an upper portion thereof. The part of the housing 31 defining the opening 31A has a rim bent outward to form a mounting part 33 which is fitted into an opening 11A formed in an upper wall of the dashboard panel 7.

Inside the housing 31, a display device 37, an optical element 39, a prism lens 41, etc. are provided. The display device 37 includes a liquid crystal panel that has a light source and generates the image light 14 according to a supplied image signal. The optical element 39 controls the shape and direction of the image light 14 output from the display device 37. The prism lens 41 refracts the image light 14 that has passed through the optical element 39 in an upward direction or toward the windshield 5.

The camera 12 is arranged to face the image projection surface 5A of the windshield 5 (namely, the image capturing direction is a forward direction). The camera 12 captures an image of an exterior of the cabin 9 (such as an object in the surroundings not shown in the drawings) through the windshield 5 in an image capturing range defined by an angle of view 45 thereof. The image capturing range of the camera 12 is set to an upper vicinity of the moth-eye film 25 on the windshield 5. The camera 12 has a known hardware configuration. The image captured by the camera 12 is used by a known driving assist system installed in the automobile 1.

In this way, on the image projection surface 5A of the windshield 5, only the surrounding area 17 is provided with the moth-eye structure 53, whereby reflection of light from the surrounding area 17 and propagation of light from the surrounding area 17 to the image projection area 15 can be suppressed.

There may be a case where the light passing through the windshield 5 from outside is reflected in the cabin 9 (for example, by an upper surface of the dashboard panel 7) back toward the windshield 5 as unnecessary light. Also, the image light 14 from the image projection device 27 may be scattered toward an area of the windshield 5 other than the image projection area 15 as unnecessary light.

In the surrounding area 17 of the present embodiment, the moth-eye structure 53 suppresses reflection of such unnecessary light. Thus, the unnecessary light is prevented from being reflected by the surrounding area 17 to enter the user's field of view, whereby the visibility of the image displayed on the image projection area 15 improves.

Also, in the conventional technology, the incident light entering the windshield 5 may propagate in the windshield 5 while being reflected by the boundary surfaces of the windshield 5 multiple times. Therefore, the light incident on the surrounding area 17 could propagate, as unnecessary light, to an area inside the surrounding area 17 (the image projection area 15) or an area outside the surrounding area (the image capturing range of the camera 12).

However, in the present embodiment, the moth-eye structure 53 provided in the surrounding area 17 suppresses the multi-reflection of unnecessary light (namely, allows the unnecessary light to pass therethrough). As a result, the unnecessary light is prevented from propagating in the windshield 5 to enter the user's field of view, whereby the visibility of the image displayed on the image projection area 15 improves.

Further, in the present embodiment, the propagation of unnecessary light to the image capturing range of the camera 12 including an area outside the surrounding area 17 is suppressed. Thereby, deterioration of the image captured by the camera 12 due to propagation of unnecessary light to the image capturing range is suppressed. Note that in the present embodiment, the camera 12 is installed as the external environment sensor, but the present invention is not limited to this, and an infrared sensor, a millimeter wave sensor, a radar or the like having a detection region covering the vicinity of the surrounding area 17 may be used as the external environment sensor.

Next, with reference to FIGS. 3 and 4A to 4C, exemplary structures of the moth-eye film 25 will be described.

As shown in FIG. 3, for example, the moth-eye film 25 has a base film 51 made of a transparent resin and attached (pasted) to the inner surface 13A of the windshield main body 13. Also, on a flat surface 51A of the base film 51 facing the cabin 9, a moth-eye structure 53 including multiple bumps 52 (fine irregularities) is formed. The multiple bumps 52 have substantially the same configuration. The thickness of the moth-eye film 25 is smaller than the thickness of at least the windshield 5.

The moth-eye film 25 is disposed only at the position corresponding to the annular surrounding area 17 surrounding the image projection area 15 (also see FIG. 2). Therefore, the moth-eye film 25 has an annular shape having a substantially rectangular outer edge and a substantially rectangular central opening (or inner edge). The opening of the moth-eye film 25 corresponds to the image projection area 15.

The multiple bumps 52 have nanometer-scale heights smaller than the wavelength of visible light (380 to 780 nm). Also, an interval L of the multiple bumps 52 is set to 100 to 300 nm, for example.

Note that another layer such as a transparent adhesion layer may be interposed between the base film 51 and the windshield main body 13.

Also, the shape of the multiple bumps 52 of the moth-eye film 25 is not limited to that shown in FIG. 3. The multiple bumps 52 preferably have at least one of a gradual increase of the bump height, a gradual increase of the bump density, and a gradual decrease of an interval between adjacent bumps, in a direction from a periphery 15A of the image projection area 15 (see FIG. 2) toward an outer side.

Figure 4A:
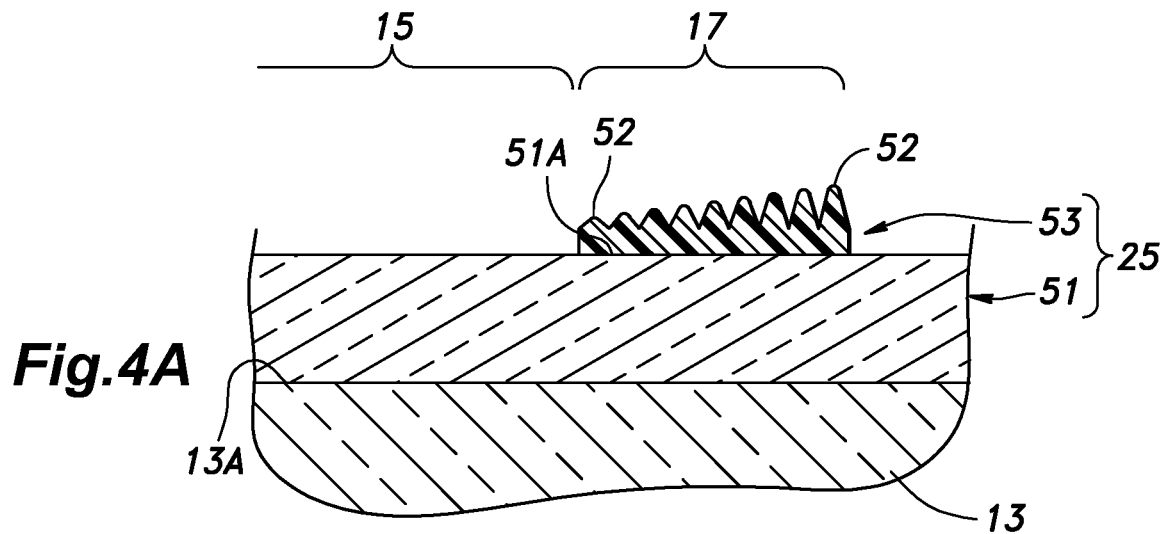
FIG. 4A is an explanatory diagram showing modifications of the moth-eye structure shown in FIG. 3.

More specifically, as shown in FIG. 4A for example, configuration may be made such that the height of the multiple bumps 52 decreases gradually from the position remote from the image projection area 15 (an outer edge 17A of the surrounding area 17; see FIG. 2) toward the periphery 15A of the image projection area 15 (an inner edge 17B of the surrounding area 17; see FIG. 2). Note that the "gradual decrease" of the height of the bumps 52 means that the height of the multiple bumps 52 has a tendency of generally decreasing from the position remote from the image projection area 15 toward the periphery 15A of the image projection area 15. Therefore, in a part of the region from the position remote from the image projection area 15 to the periphery 15A of the image projection area 15, adjacent bumps 52 may have the same height. For example, the height of adjacent bumps 52 may change in steps instead of changing continuously.

Figure 4B:
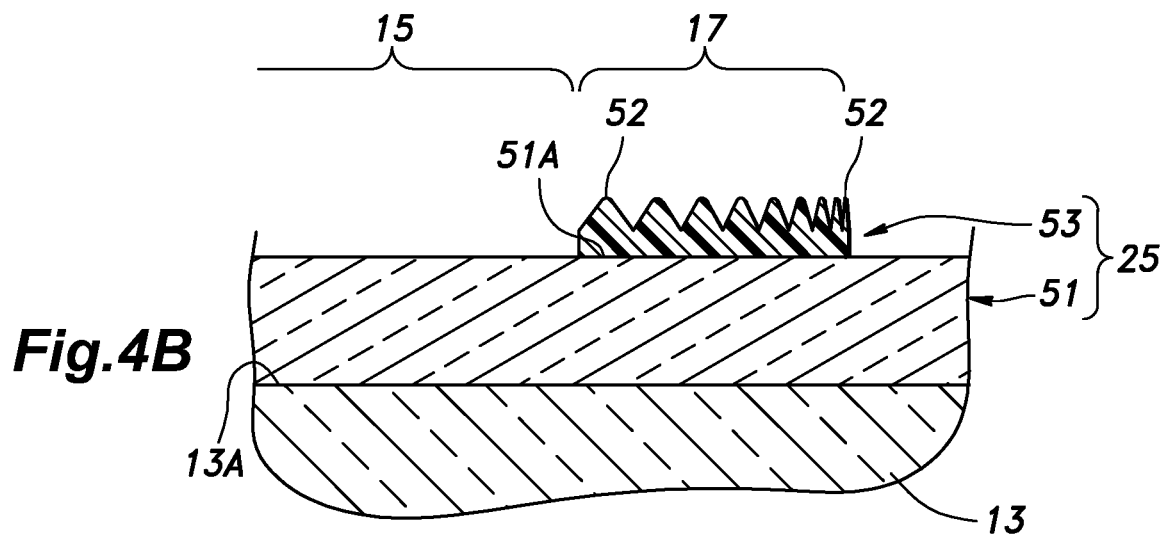
FIG. 4B is an explanatory diagram showing other modifications of the moth-eye structure shown in FIG. 3.

Also, as shown in FIG. 4B for example, configuration may be made such that the density of the multiple bumps 52 decreases gradually from the position remote from the image projection area 15 toward the periphery 15A of the image projection area 15. Note that the "gradual decrease" of the density of the bumps 52 means that the density of the multiple bumps 52 (the number of bumps 52 per unit area) has a tendency of generally decreasing from the position remote from the image projection area 15 toward the periphery 15A of the image projection area 15. Therefore, in a part of the region from the position remote from the image projection area 15 to the periphery 15A of the image projection area 15, the density of the bumps 52 may be constant. For example, the density of the bumps 52 may change in steps instead of changing continuously.

Figure 4C:
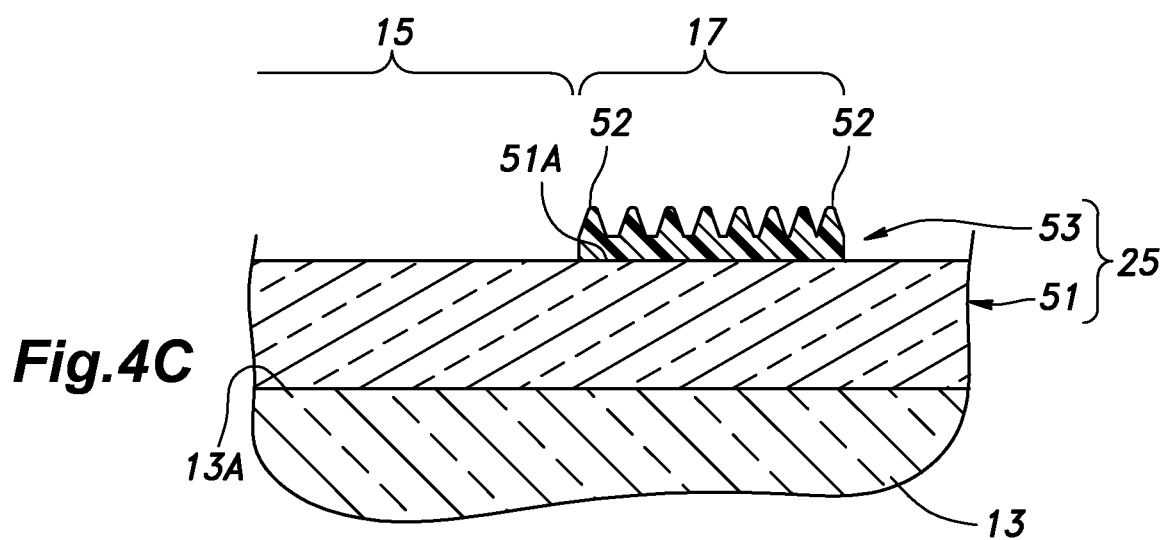
FIG. 4C is an explanatory diagram showing still other modifications of the moth-eye structure shown in FIG. 3.

Also, as shown in FIG. 4C for example, configuration may be made such that the interval L between adjacent bumps 52 increases gradually from the position remote from the image projection area 15 toward the periphery 15A of the image projection area 15. Note that the "gradual increase" of the interval L between adjacent bumps 52 means that the interval L between adjacent bumps 52 has a tendency of generally increasing from the position remote from the image projection area 15 toward the periphery 15A of the image projection area 15. Therefore, in a part of the region from the position remote from the image projection area 15 to the periphery 15A of the image projection area 15, the interval between adjacent bumps 52 may be unchanged. For example, the interval L between adjacent bumps 52 may change in steps instead of changing continuously.

According to the structures shown in FIGS. 4A to 4C, the boundary between the image displayed on the image projection area 15 and the surrounding area 17 formed with the moth-eye structure 53 becomes less conspicuous, whereby discomfort of the user is reduced and the design of the image projection area 15 and its surroundings is improved.

Figure 5A:
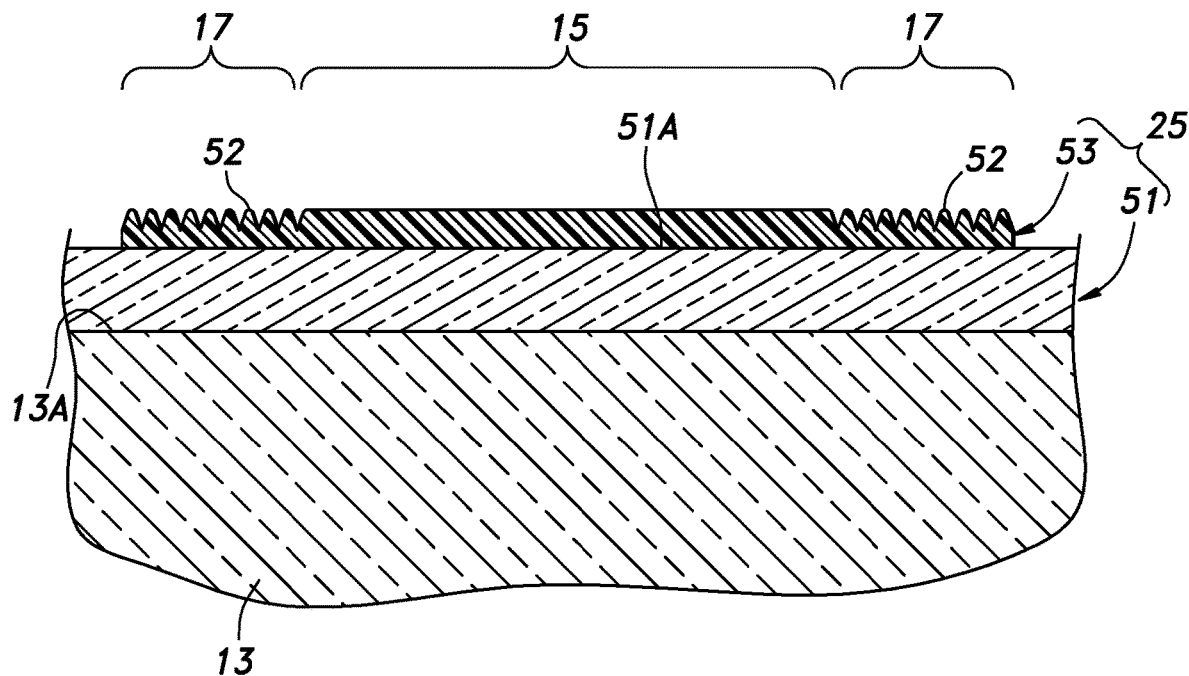
FIG. 5A is a sectional view showing modifications of the structure of an image projection surface of the windshield.
Figure 5B:
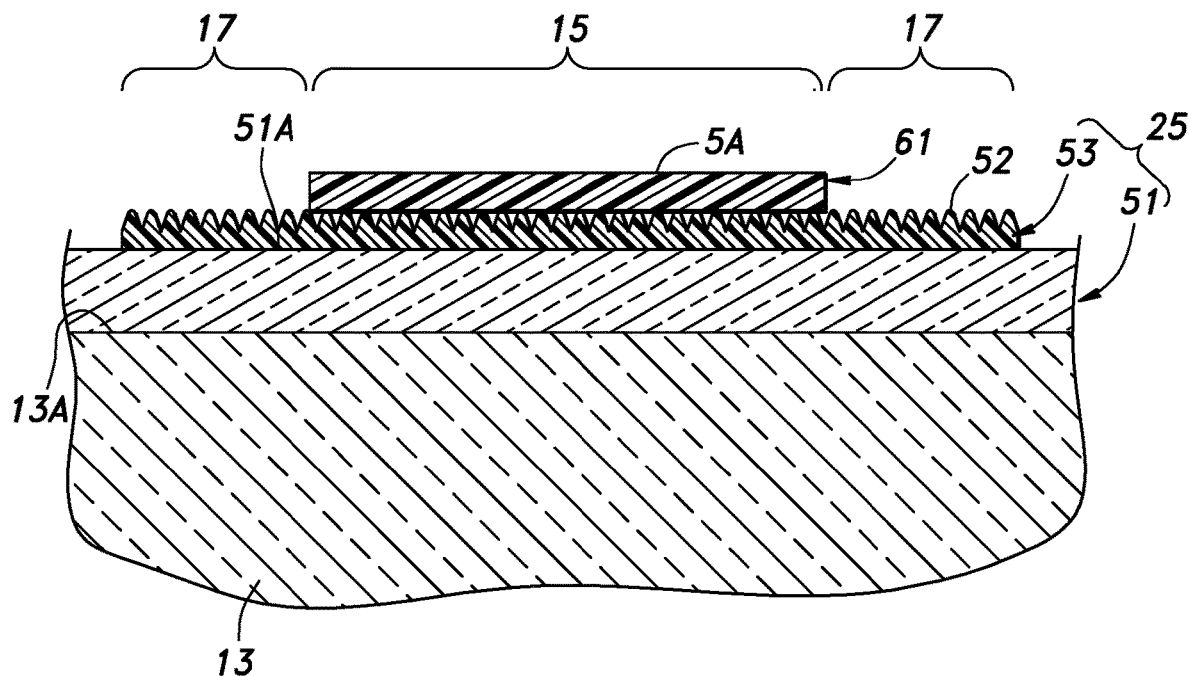
FIG. 5B is a sectional view showing other modifications of the structure of an image projection surface of the windshield

Next, with reference to FIGS. 5A and 5B, modifications of the structure of the image projection surface 5A of the windshield 5 will be described. FIGS. 5A and 5B show first and second modifications, respectively. Note that the features of the image projection surface 5A regarding the first and second modifications that are not particularly mentioned in the following are the same as those of the above-described structure, and detailed explanation therefor may be omitted.

In the above-described example, the moth-eye film 25 has an annular shape. However, the moth-eye film 25 is not limited to an annular one and may be configured to have no opening as in the first modification shown in FIG. 5A, for example.

In the moth-eye structure 53 of the moth-eye film 25 according to the first modification, a part corresponding to the image projection area 15 is not provided with the bumps 52 and forms a flat surface. In this way, it is possible to make a part of the moth-eye film 25 (an area corresponding to the image projection area 15) function as an image projection film suitable for projection (display) of an image by the HUD 11.

Also, as in the second modification shown in FIG. 5B, for example, it is possible to provide the bumps 52 over the entirety of the inner surface (the surface on the side of the cabin 9) of the moth-eye film 25 and to attach (paste) a transparent image projection film 61 to a region of the inner surface of the moth-eye film 25 corresponding to the image projection area 15. In this case, the region of the inner surface of the moth-eye film 25 corresponding to the image projection area 15 is covered by the image projection film 61. Thereby, the inner surface (the surface facing the cabin 9) of the image projection film 61 serves as the image projection surface 5A. Note that a known optical film can be used as the image projection film 61. Also, the image projection film 61 can be formed on the moth-eye film 25 as a semi-transparent layer.

Note that with the moth-eye film 25 shown in FIG. 3, the image projection film 61 may be disposed in the opening (the image projection area 15) of the moth-eye film 25. Thereby, when both of the moth-eye film 25 and the image projection film 61 are attached to the windshield 5, increase of the substantive thickness the windshield 5 can be suppressed.

Next, with reference to FIGS. 6A and 6B, a manufacturing method of the moth-eye film 25 will be described. As the manufacturing method of the moth-eye film 25, a known technology (for example, nanoimprint technology) may be used.

Figure 6A:
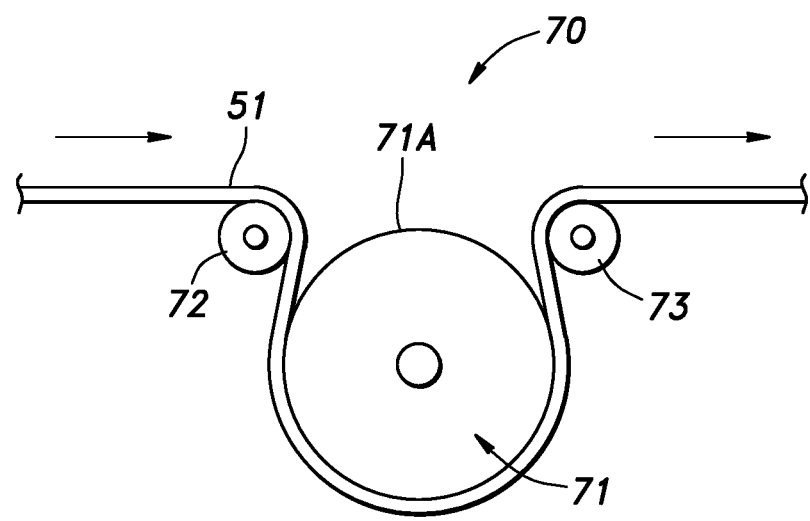
FIG. 6A is an explanatory diagram showing a manufacturing method of the moth-eye structure.
Figure 6B:
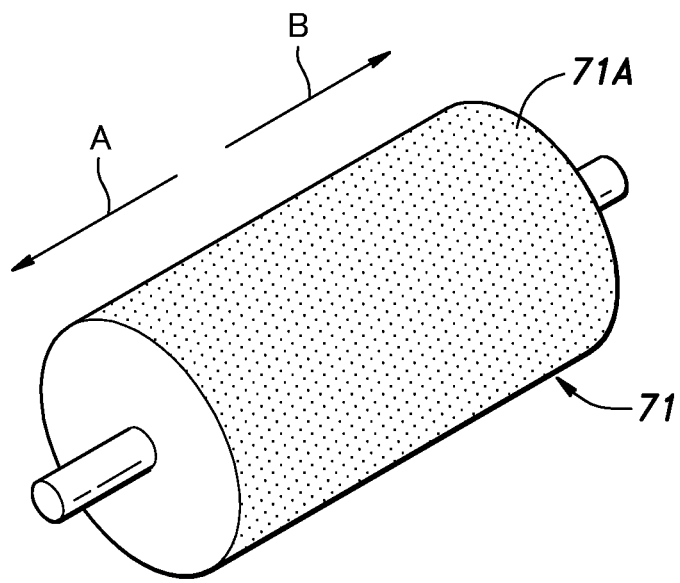
FIG. 6B is an explanatory diagram showing the manufacturing method of the moth-eye structure.

For example, as shown in FIG. 6A, a manufacturing device 70 for the moth-eye film 25 includes a transfer roller 71 having an inverted shape (holes and the like) corresponding to the bumps 52 (uneven surface shape) of the moth-eye structure 53 formed in a surface 71A thereof and transport rollers 72, 73 for transporting a strip-shaped base film 51.

In the manufacturing device 70, a surface of the base film 51 applied an ultraviolet (UV) curable resin, for example, is pressed against the surface of the transfer roller 71 so that the inverted shape is formed on the UV curable resin (thin film) (the surface shape of the transfer roller 71 is transferred). Thereafter, ultraviolet rays are irradiated onto the UV curable resin to form the moth-eye structure 53 including the multiple bumps 52 on the base film 51.

Note that the base film 51 may be, for example, an acrylic film, a polyester film, a polycarbonate film, and the like. The material forming the moth-eye structure 53 may be, for example, a photocurable resin containing an epoxy-based resin, a urethane-based resin or the like mixed with a photopolymerization initiator, a radical generator, etc.

Also, when forming the bumps 52 as shown in FIG. 4A, for example, the inverted shape on the surface of the transfer roller 71 is preferably formed such that the bump height decreases gradually (or increases gradually) in the axial direction of the transfer roller 71. In this case, the inverted shape on the surface of the transfer roller 71 may be formed such that the bump height increases gradually from the center of the transfer roller 71 in each of the directions indicated by arrows A, B. Note that the bumps 52 as shown in FIGS. 4B and 4C can be similarly formed.

Concrete embodiments of the present invention have been described in the foregoing, but the present invention is not limited to the above embodiments and may be modified or altered in various ways. For example, in the above-described embodiment, the inner surface of the window (windshield 5) was formed with moth-eye structure but the outer surface of the window also may be similarly formed with a moth-eye structure. Further, the window used in the present invention is not limited to the windshield 5 and any member that can function as the reflector of the head-up display (for example, a rear window or a side window of the vehicle body 3) may be used.

The invention claimed is:

1. A vehicle body structure having a head-up display, comprising:
    a window that defines a cabin and is used as a reflector of the head-up display; and
    an image projection device that projects an image toward the window,
    wherein an image projection surface of the window that is positioned closest to the cabin includes a prescribed image projection area onto which the image is projected and a surrounding area that surrounds the image projection area, and
    of the image projection area and the surrounding area of the image projection surface, only the surrounding area is formed with a moth-eye structure,
    wherein the window comprises:
    a window main body;
    a moth-eye film attached to a cabin-side surface of the window main body and formed with the moth-eye structure; and
    an image projection film disposed on the image projection area,
    wherein the moth-eye film is disposed on the image projection area and the surrounding area, and
    the image projection film is attached to a cabin-side surface of a part of the moth-eye film corresponding to the image projection area.

* * * * *